United States Patent [19]
Smith

[11] Patent Number: 5,692,542
[45] Date of Patent: Dec. 2, 1997

[54] APPARATUS FOR CAPPING AN AIR VACUUM OUTLET

[75] Inventor: Mark F. Smith, Buda, Tex.

[73] Assignee: Advanced Micro Devices, Inc., Sunnyvale, Calif.

[21] Appl. No.: 543,223

[22] Filed: Oct. 13, 1995

[51] Int. Cl.⁶ .................................................. F16L 55/11
[52] U.S. Cl. ...................... 138/89; 138/94; 15/314; 220/212.5
[58] Field of Search .................. 138/89, 89.1, 89.3, 138/92, 94; 15/314, 310, 331; 4/295; 220/212.5, 307, 308, 281, DIG. 33; 215/355, 228; 285/901

[56] References Cited

U.S. PATENT DOCUMENTS

| | | | |
|---|---|---|---|
| 849,618 | 4/1907 | Hurlburt | 138/89 |
| 1,096,278 | 5/1914 | Sutton | 285/901 |
| 2,791,792 | 5/1957 | Shearer, Sr. | 15/314 |
| 3,952,914 | 4/1976 | Vogt | 220/307 |
| 4,892,216 | 1/1990 | Scott | 220/DIG. 33 |
| 5,285,917 | 2/1994 | Hofmann | 220/212.5 |
| 5,346,086 | 9/1994 | Harris | 220/307 |

Primary Examiner—David Scherbel
Assistant Examiner—James F. Hook
Attorney, Agent, or Firm—Kevin L. Daffer; Conley, Rose & Tayon

[57] ABSTRACT

An air vacuum system is provided. The air vacuum system is used to clean or remove dust particles or other particulate matter from a building. The vacuum system includes an air vacuum outlet flush-mounted with a floor region of the building. The air vacuum outlet comprises a vacuum port operably coupled to a vacuum supply. Further included with the air vacuum outlet is a vacuum port cap which can be mounted within the vacuum port to seal the air flow within the vacuum supply. The vacuum port cap is designed having a pivot arm which extends from a position flush with the surface of the cap to a position in which a user can grasp the arm and lift the cap from the port. The arm thereby pivots about an axis which extends through a receptacle formed within the upper surface of the cap. The receptacle is used to receive the pressed end of the arm for allowing the opposed end to protrude upward. The opposed end includes flanges which can be grasped by the user's fingers to remove the cap from the vacuum port.

16 Claims, 3 Drawing Sheets

FIG.6
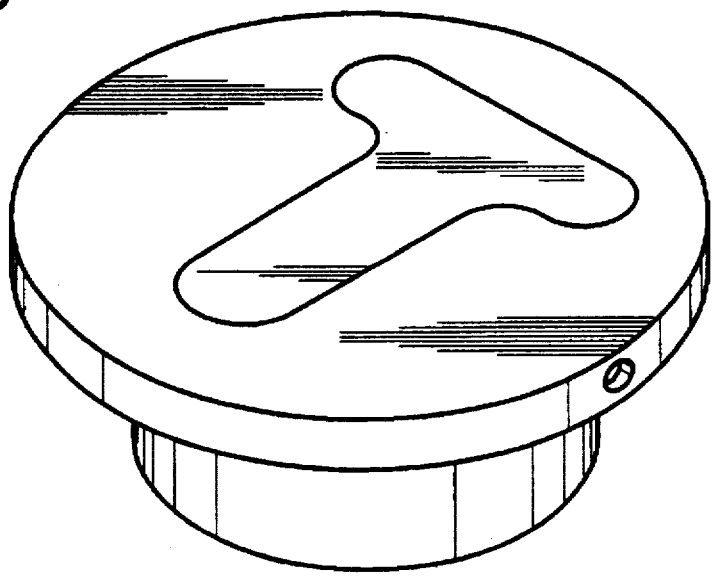
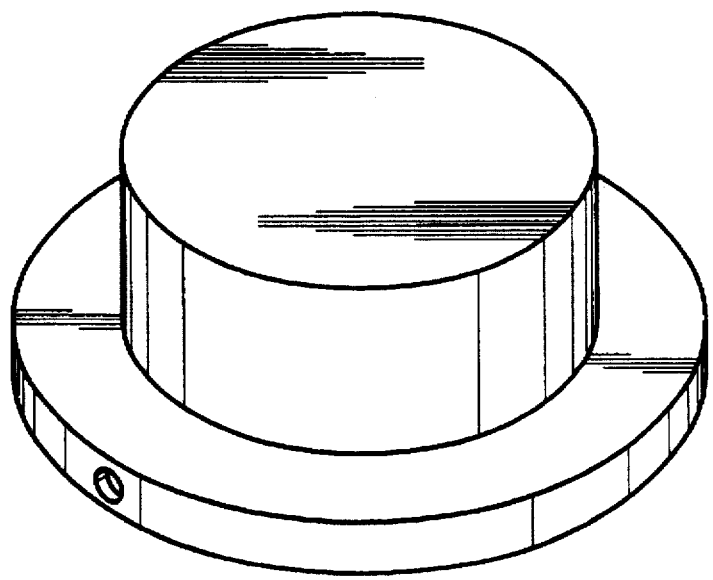
FIG.7

APPARATUS FOR CAPPING AN AIR VACUUM OUTLET

BACKGROUND OF THE INVENTION

1. Field of the Invention

This invention relates to a port arranged at one end of an air vacuum line and, more specifically, to a vacuum port cap having a pivot arm which extends from a position flush with the upper surface of the cap to a position above the cap upper surface so that a user can readily grasp the arm and lift the cap from the port.

2. Description of the Relevant Art

Central vacuum systems are generally well known. The vacuum systems are centralized in that a vacuum source is provided at a single location within a building configured with the system. A plurality of tubes extend from the single vacuum source to openings or "ports" mounted within a wall and/or floor of the building.

Commercial buildings differ from residential buildings in that walls are generally portable, and can be reconfigured to suit the particular business being housed. Commercial buildings are therefore known for having readily moveable walls, or walls which can be rearranged to a desired floor layout. Since walls are more likely to move in a commercial building, the vacuum ports are generally placed in the building floor area rather than the walls.

It is important that, when mounted within the floor, the port upper surface be mounted flush with the floor upper surface so as to prevent occupants from tripping on the port. Flush mounting the vacuum port not only prevents occupational hazards but also minimizes risk of catching the port on heavy industrial equipment and breaking the port. A broken port might compromise air flow thereby jeopardizing vacuum integrity. If air flow is jeopardized, vacuum pressure may be inadequate for sucking dust and various other particulate matter from the building via a vacuum hose connected to the port.

Flush mounting a vacuum port to a floor of a commercial building presents many challenges. However, it is the design of a cap dimensioned to fit within the port that presents even more challenges. The vacuum port cap must be made to fit within the vacuum port to seal air flow at the port, when installed. The vacuum port cap must be designed not only to terminate air flow at the vacuum port, but also to maintain the flush-mount configuration established by the port upper surface.

FIG. 1 illustrates a top plan view of a conventional vacuum port cap 10a mounted within vacuum port 12. At the upper surface of cap 10a is a recess 14. Recess 14 includes a receptacle 16 placed through the center of recess 14 a spaced distance above recess 14 upper surface. The space between receptacle 16 and recess 14 allows ingress of a tool which hooks underneath receptacle 16. The tool (not shown) is used to lift cap 10a from port 12 thereby exposing an opening into a tube connected to port 12. Air flow into the port 12 opening is created by the vacuum supply connected to the tube opposite port 12.

FIG. 2 is a top plan view of another conventional port cap 10b mounted within port 12. Cap 10b includes a ring placed through a region of the upper surface of cap 10b. Ring 18 is shown in a downward position against a side of cap 10b upper surface.

FIGS. 1 and 2 illustrate conventional cap 10 configurations. Caps 10a and 10b are either gravitationally held within the floor-mounted port 12 and/or held by vacuum pressure created by the vacuum source. Cap 10a requires insertion of a special tool into the space between receptacle 16 and recess 14 to draw the cap upward from its seated position. Cap 10b requires a user to grasp ring 18 and move it to an upward extending position such that the user can place his or her finger through the upward extending ring. In many instances, the user misplaces the tool used to extract cap 10a. As a substitute, the user often times ties a wire or string to receptacle 16. Unfortunately, the wire presents a trip hazard to occupants walking across cap 10a. A similar hazard occurs when ring 18 is left in an upward-extending position. Ring 18, or the upper surface protrusion through which ring 18 extends, can catch occupants feet. Further, not all user's have sufficient hand dexterity to grasp ring 18 and move it to an upward position for insertion of a lifting finger.

It is therefore desirable that a vacuum port cap be devised which does not require a separate tool for its removal. Further, the cap must have an upper surface which is flush with the upper surface of the vacuum port. In both instances, the cap must be useable in a commercial setting, within floor-mounted vacuum ports.

SUMMARY OF THE INVENTION

The problems outlined above are in large part solved by an improved vacuum port cap of the present invention. That is, the vacuum port cap hereof does not require a separate tool to extract the cap from the vacuum port. Further, the present cap has an upper surface which is gravitationally and/or vacuum mounted flush with the upper surface of the port. The cap includes a pivot arm which extends from a position flush with the upper surface of the cap to a position in which a user can grasp the arm and lift the cap from the port. The arm includes a pair of flanges which extend from one end of the arm. The flanges pivot upward when a user depresses the end of the arm opposite the flanges. Once exposed, the flanges are dimensioned to receive a user's index finger and finger adjacent the index finger. Respective fingers are drawn beneath respective, upward-extending flanges to draw the arm and pivotally connected cap from its held position within the port.

Broadly speaking, the present invention comprises a vacuum port cap. The vacuum port cap includes a cap body having exposed upper and lower circular surfaces. The upper circular surface is larger in diameter than the lower circular surface. A receptacle is formed within the upper circular surface. An arm is attached about an axis which extends through the receptacle along a plane parallel to and between the upper and lower circular surfaces.

The present invention further contemplates an air vacuum outlet. The air vacuum outlet comprises a vacuum port operably coupled to vacuum supply. The vacuum port includes an upper port surface mounted flush with a floor surface. A vacuum port cap is also provided having upper and lower circular surfaces. The upper circular surface is held flush with the upper port surface. A flange extends from one end of an arm pivotally attached to the upper circular surface for receiving upward force to draw the vacuum cap from its held position within the vacuum port.

BRIEF DESCRIPTION OF THE DRAWINGS

Other objects and advantages of the invention will become apparent upon reading the following detailed description and upon reference to the accompanying drawings in which:

FIG. 6 is a top, front and left side isometric view of a vacuum port cap according to the present invention; and FIG. 7 is a bottom, back and right side isometric view of the vacuum port cap according to the present invention.

Figure 1:
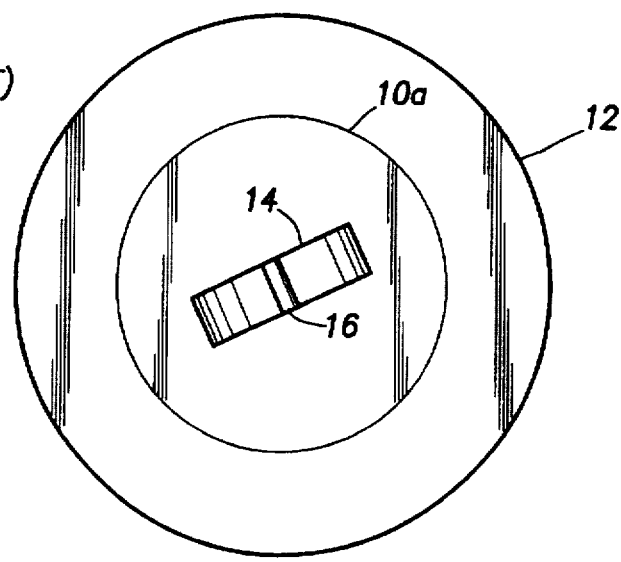
FIG. 1 is a top plan view of a conventional vacuum port cap mounted within a vacuum port.
Figure 2:
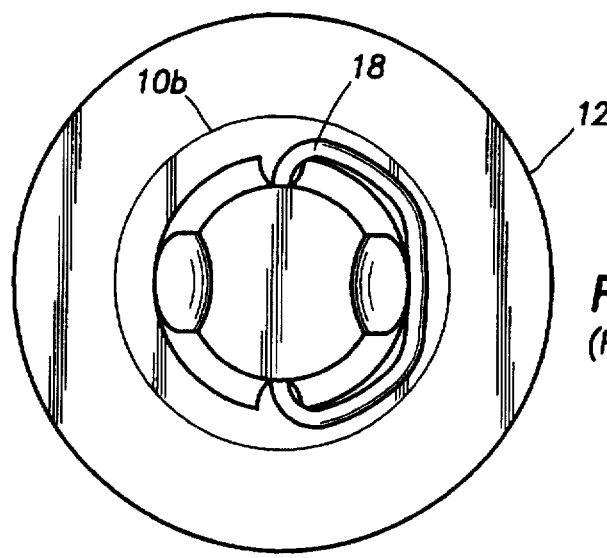
FIG. 2 is a top plan view of another conventional vacuum port cap mounted within a vacuum port.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

A vacuum supply present at various vacuum ports arranged throughout a commercial building serves many purposes. One purpose is for receiving a vacuum hose into one or more ports for extracting dust and other particulate from the occupied area of the building through the vacuum port and into a central vacuum arranged distal from the working area. The vacuum pressure can vary depending upon its desired application. For example, vacuum pressure needed to remove dust and other particulate matter from within a semiconductor fabrication area is generally 15 to 30 inches of mercury measured at the port. Given such an environment, it is desirable to manufacture the vacuum port as well as the vacuum cap from a stainless steel material, or any material which is nonvolatile with respect to the various gases used in wafer fabrication.

Figure 3:
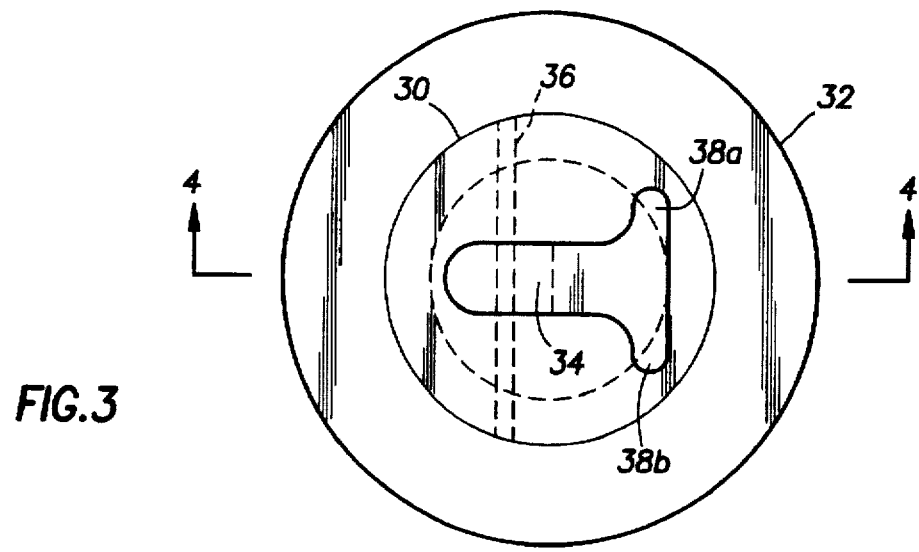
FIG. 3 is a top plan view of a vacuum port cap, according to the present invention, mounted within a vacuum port.

Turning now to the drawings, FIG. 3 illustrates a top plan view of an improved vacuum port cap 30 mounted within vacuum port 32. Cap 30 includes an upper surface into which arm 34 is pivotally attached about a pivot point or axis 36. Arm 34 includes a pair of flanges 38a and 38b extending laterally from each side of arm 34 at one end of arm 34.

Figure 4:
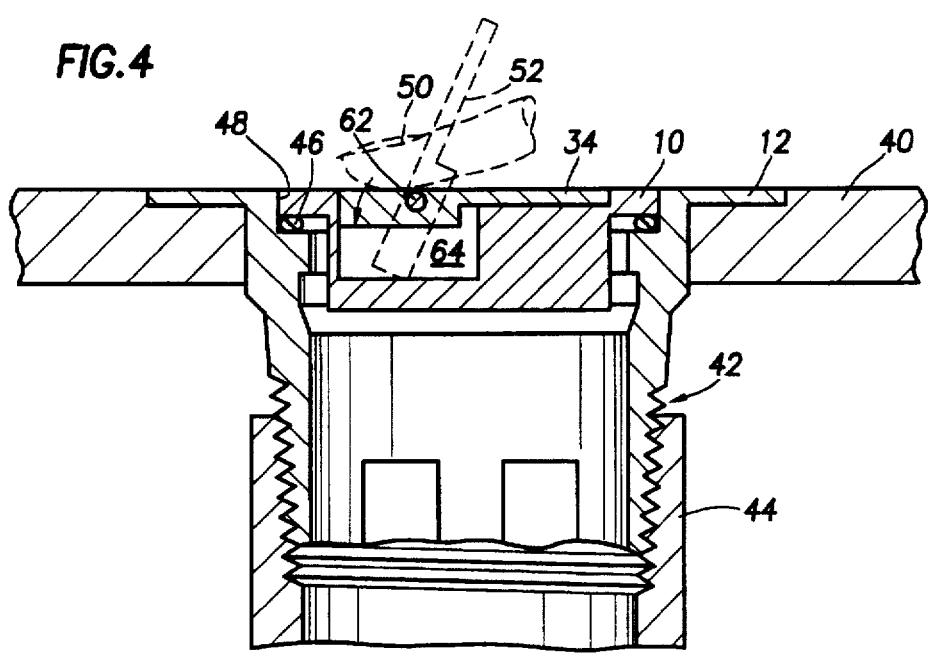
FIG. 4 is a cross-sectional view along plane 4 of FIG. 3 showing an upwardly extendable flange which pivots about an axis perpendicular to plane 4.

FIG. 4 illustrates vacuum port 32 and vacuum cap 30 in cross-section along plane 4 of FIG. 3. The upper surface of port 32 is shown mounted flush with the upper surface of floor 40. Floor 40 includes any structure upon which occupants of a building stand or place various objects upon. Port 32 includes outer diameter threads 42 which receive corresponding threads configured at the inner diameter of one end of vacuum tube 44. The port-configured end of tube 44 is opposite the end which couples to the central vacuum supply (not shown).

Cap 30 is shown in FIG. 4 seated within port 32. In its fully seated position, cap 30 upper surface is flush with port 32 and floor 40 upper surfaces. A pliable o-ring 46 is configured adjacent the inner surface 48 of port 32. When compressed between port 32 and cap 30, o-ring 46 prevents air flow and loss of vacuum pressure within the vacuum system. Cap 30 is held in place against o-ring 46 by gravitational force, vacuum pressure, or the combination of both. Placement of a user's finger 50 (shown in phantom) against one end of arm 34 causes the opposing end of arm 34 to pivot in an upward position. The upward-exposed end 52 (shown in phantom) of arm 34 includes flanges 38a and 38b, shown in FIG. 3.

Figure 5:
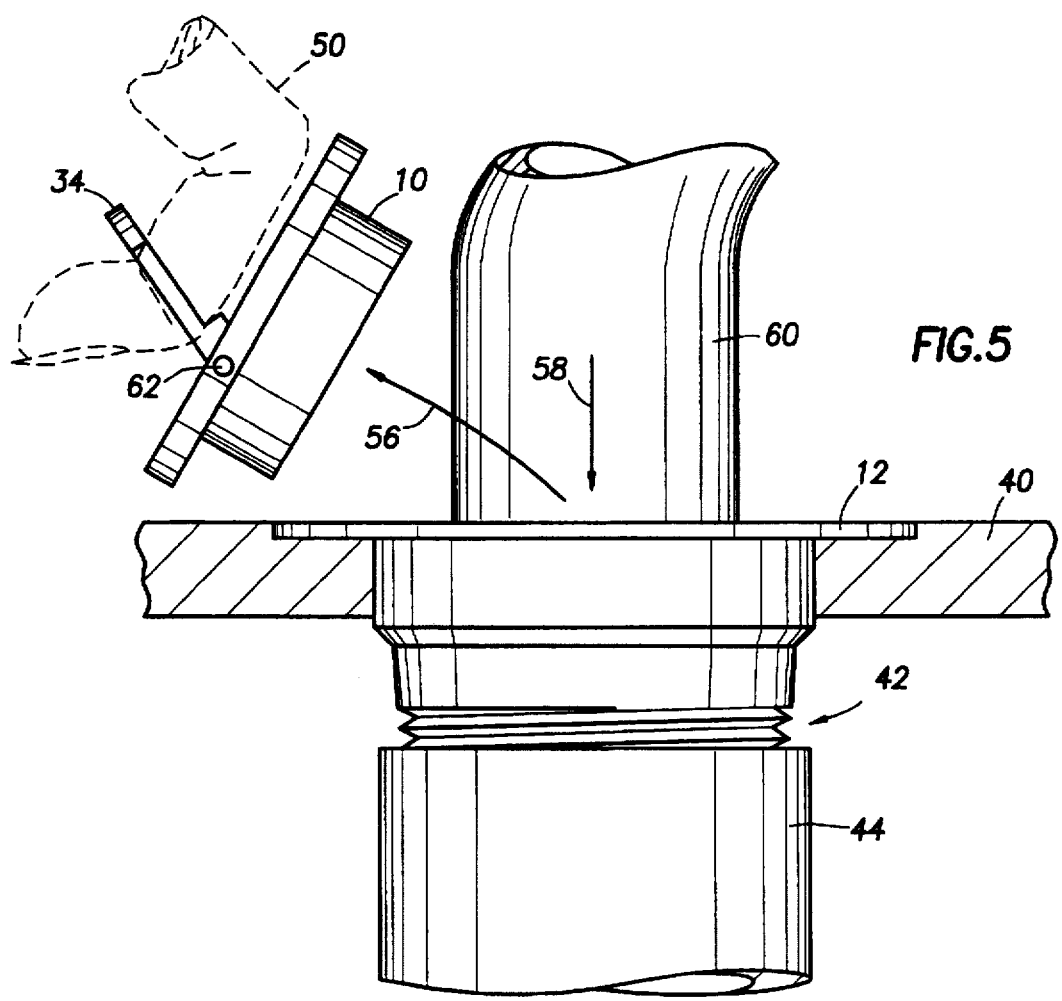
FIG. 5 is an elevational view of the vacuum port cap removed, according to the present invention, and a vacuum hose thereafter inserted into the vacuum port.

Turning to FIG. 5, the upward-exposed end of arm 34 allows insertion of a pair of fingers underneath respective flanges 38a and 38b. More specifically, the index finger and finger adjacent the index finger can thereby be placed directly beneath flanges 38a and 38b, respectively. The finger pair is then used to draw cap 30 from port 32 along arrow 56. Separation of cap 30 from port 32 allows temporary escape of vacuum pressure from vacuum tube 44 prior to subsequent insertion of a vacuum hose 60. Vacuum hose 60 is inserted along arrow 58 in the opening vacated by cap 30. Vacuum hose 60 is used with an appropriate attachment to draw dust and various other particulate matter from a building having floor 40. Dust and other matter is drawn through hose 60, port 32, tube 44 and subsequently to a centralized vacuum source.

FIGS. 6 and 7 illustrate two separate view angles of every portion of vacuum port cap 30. FIG. 6 is an isometric view of the top, front and left-side of cap 30, while FIG. 7 is an isometric view of the bottom, back and right-side of cap 30.

It will be appreciated to those skilled in the art having the benefit of this disclosure that this invention is believed to be capable of applications with any type of centralized air vacuum system, wherein the vacuum port or outlet location is situated in a floor area, as opposed to a wall. Furthermore, it is also to be understood that the form of the invention shown and described is to be taken as exemplary, presently preferred embodiments. Various modifications and changes may be made to the vacuum port cap as would be obvious to a person skilled in the art having the benefit of this disclosure. For example, arm 34 pivot point can be constructed in numerous ways. Construed in an illustrative rather than a restrictive sense, the pivot point hereof is shown comprising a pin extending through cap 30. The pin is shown in reference to FIGS. 4 and 5, and is denoted as numeral 62. Pin 62 is situated along axis 36 shown in FIG. 3 between the upper and lower surfaces of cap 30. It is understood, however, that a pin need not be employed provided a pivot is produced, whereupon entry of one end of arm 34 into receptacle 64 causes the flange-configured end to protrude upward. FIG. 4 illustrates the unique configuration of receptacle 64. Receptacle 64 has a shallow portion and a deep portion. The shallow portion is of a depth substantially equal to the thickness of the flange-embodied end of arm 34. The deep portion of receptacle 64 allows the depressed end of arm 34 to extend downward when force is applied. Arm 34 is also of unique configuration, having a thicker portion designed to extend within the deeper region of receptacle 64. The thinner portion of arm 34 is designed to fit within the shallower region of receptacle 64. It is intended that the following claims be interpreted to embrace all such modifications and changes and, the specification and drawings are to be regarded in an illustrative rather than a restrictive sense.

What is claimed is:

1. A vacuum port cap, comprising:
   a cap body having opposed upper and lower circular surfaces, wherein the upper circular surface is larger in diameter than the lower circular surface;
   a receptacle formed within the upper circular surface; and
   an arm attached to said cap body about an axis located between opposing ends of said arm and extending through said receptacle along a plane parallel to and between the upper and lower circular surfaces, wherein one end of said arm is adapted to pivot downward into said receptacle to bring another end of said arm above the upper circular surface.

2. The vacuum port cap as recited in claim 1, wherein said receptacle extends from the upper circular surface partially toward the lower circular surface.

3. The vacuum port cap as recited in claim 1, wherein said receptacle extends partially across the upper circular surface.

4. The vacuum port cap as recited in claim 2, wherein said receptacle comprises a shallow portion and a deep portion, wherein at least a portion of said deep portion extends on one side of said axis a first distance toward the lower surface and wherein said shallow portion extends on another side of said axis a second distance toward the lower surface.

5. The vacuum port cap as recited in claim 4, wherein said first distance is greater than said second distance.

6. The vacuum port cap as recited in claim 4, wherein said deep portion forms a space to receive a downwardly extending portion of said arm when said arm is pivoted about said axis.

7. The vacuum port cap as recited in claim 4 wherein said second distance is substantially equal to a thickness of said arm.

8. The vacuum port cap as recited in claim 1, wherein said arm further comprises an end, the end comprising a pair of flanges extending in diverging directions.

9. The vacuum port cap as recited in claim 4, wherein said arm includes a member having opposing ends, wherein one end is adapted to pivot downward into said deep portion from a position substantially flush with the upper circular surface.

10. An air vacuum outlet, comprising:
   a vacuum port operably coupled to a vacuum supply and having an upper port surface adapted to be mounted flush with an upper floor surface;
   a vacuum port cap having upper and lower circular surfaces, wherein the upper circular surface is held flush with the upper port surface; and
   a flange for drawing said vacuum port cap from said vacuum port, the flange extending from one end of an arm pivotally attached to the upper circular surface about an axis located between opposite ends of said arm.

11. The air vacuum outlet as recited in claim 10, wherein the lower circular surface extends into said vacuum port below the upper port surface.

12. The air vacuum outlet as recited in claim 10, wherein said flange is shaped to receive an upward force for drawing said vacuum port cap from said vacuum port, the upward force being supplied by two fingers of a user drawn upward from a position directly beneath said flange.

13. The air vacuum outlet as recited in claim 10, wherein said upper circular surface is flush with the upper port surface during times when the vacuum port cap is fully seated and gravitationally held within said vacuum port.

14. A method for removing a vacuum port cap from a vacuum port, comprising:
   applying a downward force to a vacuum port cap, the vacuum port cap comprising:
      a cap body having opposed upper and lower circular surfaces, wherein the upper circular surface is larger in diameter than the lower circular surface;
      a receptacle formed within the upper circular surface; and
      an arm attached to said cap body about an axis located between opposing ends of said arm and extending through said receptacle along a plane parallel to and between the upper and lower circular surfaces, wherein a first end of said arm is adapted to pivot downward into said receptacle to bring a second end of said arm above the upper circular surface,
   wherein said downward force is applied to said first end such that said first end pivots about said axis into said receptacle and said second end pivots about said axis upward to a position above said upper circular surface;
   applying an upward force to said second end such that said force draws said vacuum port cap from said vacuum port.

15. The method as recited in claim 14, wherein said first end is pivoted upon depression by a finger, and wherein said vacuum port is mounted in an upper floor surface of a wafer fabrication facility, wherein said upper circular surface is mounted substantially flush with said upper floor surface.

16. The method as recited in claim 14, wherein said upward force is supplied by a finger to a flange extending from said second end, and wherein said vacuum port is mounted in an upper floor surface of a wafer fabrication facility, wherein said upper circular surface is mounted flush with said upper floor surface.

* * * * *